United States Patent [19]

Roberts

[11] 4,032,887
[45] June 28, 1977

[54] PATTERN-RECOGNITION SYSTEMS HAVING SELECTIVELY ALTERABLE REJECT/SUBSTITUTION CHARACTERISTICS

[75] Inventor: David C. Roberts, Rochester, Minn.

[73] Assignee: International Business Machines Corporation, Armonk, N.Y.

[22] Filed: Nov. 29, 1974

[21] Appl. No.: 528,377

Related U.S. Application Data

[63] Continuation of Ser. No. 374,612, June 28, 1973, abandoned.

[52] U.S. Cl. .............. 340/146.3 ED; 340/146.3 D
[51] Int. Cl.² ......................................... G06K 9/00
[58] Field of Search .......... 340/146.3 D, 146.3 ED, 340/146.3 MA, 146.3 R

[56] References Cited

UNITED STATES PATENTS

| | | | |
|---|---|---|---|
| 3,641,495 | 2/1972 | Kiji | 340/146.3 D |
| 3,764,978 | 10/1973 | Tyburski et al. | 340/146.3 ED |
| 3,764,980 | 10/1973 | Dansac et al. | 340/146.3 D |
| 3,832,682 | 8/1974 | Brok et al. | 340/146.3 ED |

*Primary Examiner*—Leo H. Boudreau

[57] ABSTRACT

Two independent recognition logics produce separate identifications of an input pattern. In a selectable mode for minimizing reject errors, any non-reject identification is gated out. In a mode for minimizing substitution errors, both identifications must be the same. Differing, non-reject identifications always cause a reject code to be gated out.

8 Claims, 4 Drawing Figures

PATTERN-RECOGNITION SYSTEMS HAVING SELECTIVELY ALTERABLE REJECT/SUBSTITUTION CHARACTERISTICS

This is a continuation of application Ser. No. 374,612 filed June 28, 1973, now abandoned.

BACKGROUND OF THE INVENTION

The present invention relates to electrical communications, and particularly concerns systems for the machine recognition of patterns such as lexical characters.

Machines for the recognition of characters and other patterns are subject to two types of errors. Reject errors are those for which the machine is incapable of placing the input character into any of the possible classes. A rejected character is usually represented by a special code or symbol, such as . Substitution errors are those for which the machine places the character in an incorrect class, such as the improper recognition of a B as an 8. Within a recognition unit of a given size and complexity, the relative number of substitutions may be minimized by rejecting all input characters which are not recognized with a high degree of confidence. Since this approach increases the relative number of reject errors, it is said to have a high reject/substitution ratio. Conversely, a low reject/substitution ratio may be achieved by allowing non-confident guesses as to the identity of the input character. The designer of a recognition system may choose any reject/substitution ratio between these extremes as a parameter of his system. Once chosen, however, it is immutable except by redesign of the system.

The problem with the choice of a fixed reject/substitution ratio is that no single ratio is optimum for different applications of a recognition system. In reading monetary amount and account number character fields, for instance, it is usually desirable to minimize substitutions at the expense of a higher reject rate. The amount of redundancy in such fields is usually low, and the consequences of mistaken recognition are usually more serious. In reading connected text and non-critical information, however, the expense of manually correcting reject errors may be reduced by allowing a higher relative substitution rate. The redundancy of normal English text, for example, is sufficiently large that occasional incorrect characters are of little concern to intelligibility. Moreover, present-day context-recognition devices are capable of automatically correcting many substitution errors, especially when they are presented with some indication as to the possible identity of a character.

This problem has been addressed in the past. In the IBM 1287 Optical Reader, provision is made for selectively rescanning critical character fields and comparing the identifications with each other. If they differ, the character is rejected. In all other fields, only one identification is produced. The difficulty with this approach is that the same recognition logic is used for all recognition attempts, and the rescanning operation imposes a considerable time penalty.

SUMMARY OF THE INVENTION

The present invention overcomes the above and other problems by providing an improved means for selectively altering the reject/substitution characteristics of pattern-recognition systems, thus rendering such systems more flexible in a wider variety of applications.

Generally speaking, the invention is practiced by producing independent recognition codes for the same input pattern, and comparing them with each other and/or with a reject code indicating that the pattern has failed to be identified. The results of these comparisons then coact with a received reject/substitution mode indication to gate out one of the recognition codes or the reject code. The invention may be implemented by plural recognition means producing independent codes, comparison means, control means for receiving mode signals, and output means for selectively gating one of the recognition or reject codes.

Other objects, advantages and features of the invention, as well as modifications obvious to those skilled in the art, will appear in the following detailed description of several preferred embodiments thereof, taken in conjunction with the accompanying drawings.

DESCRIPTION OF THE EMBODIMENTS

Figure 1:
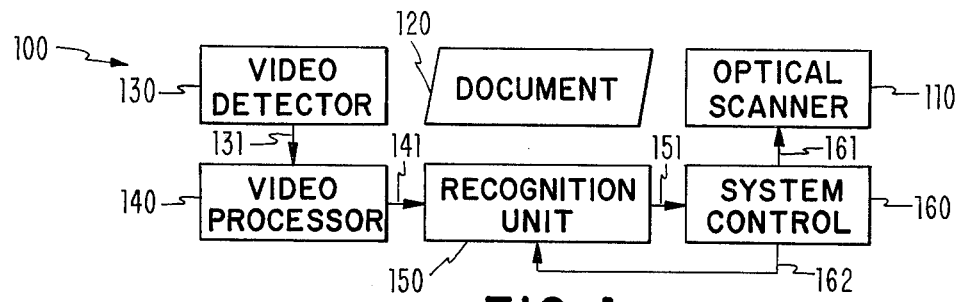
FIG. 1 is a simplified block diagram of an exemplary character-recognition system in which the invention finds utility.

FIG. 1 shows a representative recognition system 100 in which the invention finds utility. Optical scanner 110 produces a vertical raster or other scan pattern over a document 120 containing characters to be recognized. Video detector 130 converts light reflected from the document into electrical signals. These signals may then be thresholded to produce a sequence of binary digits on line 131 indicating whether the character or the background is present within particular small areas or cells of the document. Video processor 140 provides conventional functions such as filtering noise, segmenting and storing character images, smoothing contours, registering the images to a desired position and normalizing them to a desired size, and may derive a set of features or measurements representing each character. Recognition unit 150 receives the measurements or the processed pattern image on line 141 and produces a standard output code, such as EBCDIC or ASCII, representing the identity of each character. This code is passed via line 151 system control 160, which may store it or transmit it to an external device such as a bulk storage or computer (not shown). System control 160 may perform other conventional functions, such as control of the format of scanner 110 (line 161), document-transport control, and input/output (I/O) handling. Control 160 also provides mode-selection signals on line 162, as will be described hereinafter.

Figure 2:
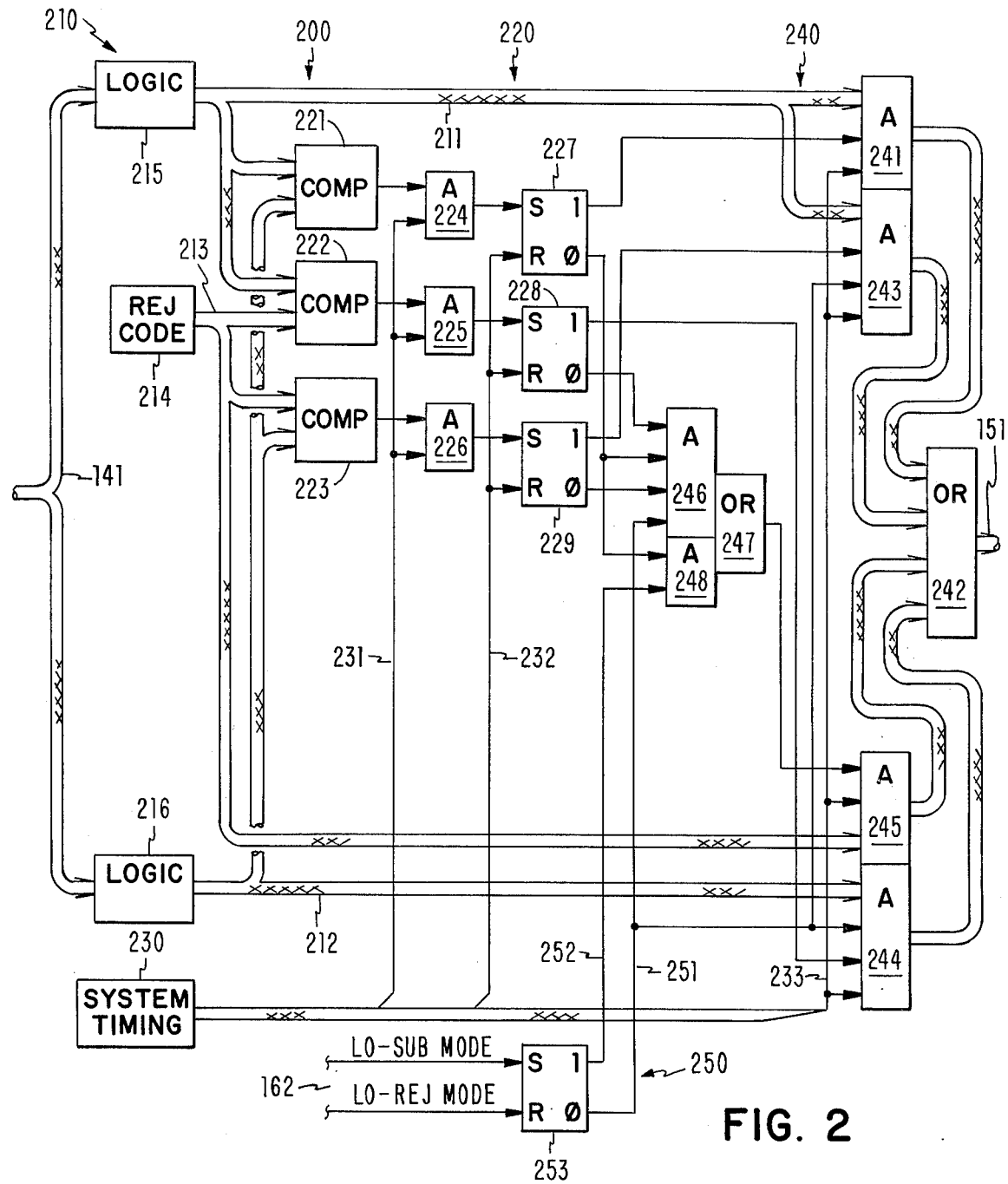
FIG. 2 shows a first embodiment of the invention.

FIG. 2 shows a digital circuit 200 according to the invention, which may be employed for recognition unit 150.

Recognition means 210 receives the aforementioned measurement signals on line 141 and produces at least two recognition codes on lines 211, 212 representing probable identities of the character under investigation. Line 213 carries a "reject" code from a conventional fixed code generator 214. The two recognition codes are generated by separate recognition logics 215, 216. Although these recognition means are of conventional design, they are independent of each other insofar as practicable. That is, they use different measurements in different orders to arrive at their respective recognition codes. Since many diverse methods of recognition design are available to the art, this requirement is not a difficult one. Any logics which differ from each other will provide the benefits of the invention.

Comparison means 220 receives the codes on lines 211–213 and produces comparison signals from their interrelationships. Digital comparator 221 produces a signal when the code from logic 215 is the same as that from logic 216, i.e., when both logics assign the same identity to the input character. Comparator 222 produces a signal when a "reject" code from logic 215 indicates that that logic is unable to identify the character. Similarly, comparator 223 indicates an inability of logic 216 to identify the character. At a particular point in the recognition cycle, a signal 231 from system timing unit 230 gates the three comparison signals through AND gates 224–226 to set respective latches 227–229. These latches had been previously reset by a signal 232 at the end of the preceeding cycle.

At a further point in the current recognition cycle, a timing signal 233 causes output gating means 240 to couple one of the lines 211–213 to output line 151, in response to signals from comparison means 220 and from mode-control means 250. In the simplest case, identical codes from logics 215 and 216 cause the "1" output of latch 227 to enable AND 241 to transmit the common recognition code on line 211 through OR 242 to output line 151.

The code on line 211 is also passed to OR 242, via AND 243, when latch 229 indicates that logic 216 has failed (i.e., produced a "reject" code), if a signal on line 251 specifies that control means 250 calls for the low-reject mode. AND 244 couples line 212 to output line 151 in the low-reject mode (line 251) when the "1" output of latch 228 signals that logic 215 has failed. When either of the grates 243, 244 is enabled because one of the logics has failed, it is possible that the other logic has also failed. In this situation, AND's 241, 243 and 244 are all enabled; but then both of the lines 211, 212 carry the same "reject" code, so that the "reject" code is passed to output line 151 through OR 242.

AND gate 245 couples a "reject" code on line 213 from generator 214 to output line 151 under either of two conditions. First, AND 246 enables AND 245 through OR 247 in the low-reject mode (line 251) when the "O" outputs of latches 227–229 indicate that logics 215, 216 have produced different recognition codes for the input character, neither of which is a "reject" code. When the two logics report successful but contradictory recognitions, the character must be rejected. (It would be possible, if desired, to resolve such a conflict in a more complex machine by taking a vote among additional logics, or to prefer the output of one logic over the other because of some design factor.) AND 245 further transmits a "reject" code to line 151 when OR 247 is enabled by AND 248. This condition occurs in the low-substitution mode (line 252) whenever the "O" output of latch 227 signifies a disagreement between the codes from the two logics 215, 216. That is, AND 248 is enabled when the logics produce successful but contradictory recognition codes, or when either logic produces a valid character code but the other logic outputs a "reject" code. Although AND 248 is not enabled when both logics fail in the low-substitution mode, the identical "reject" codes on lines 211 and 212 enables AND 241 to pass the "reject" code from logic 215 to output 151 in this situation.

The signals for selecting either the low-reject or the low-substitution mode are received and staticized by latch 253 of mode-control means 250. They are shown as emanating from system control 160, FIG. 1, over lines 162. The source of these signals is arbitrary; they may be selected by an operator through a manual switch (not shown) on the machine. They may also be produced automatically, if desired, by a program in system control 160, or by an external device (not shown) connected to control 160.

Figure 3:
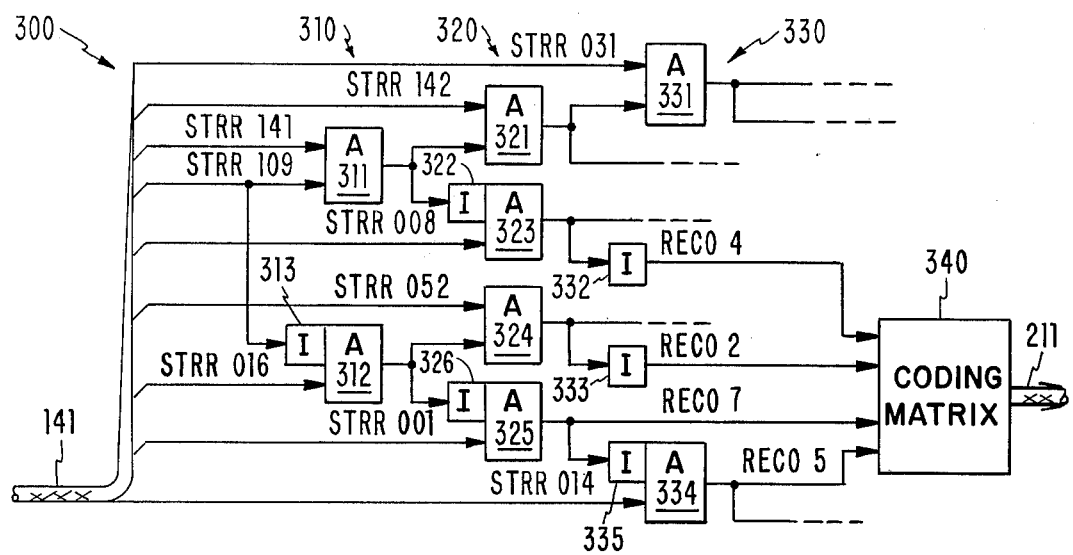
FIG. 3 illustrates an exemplary form of recognition logic useful in the embodiment of FIG. 2.

FIG. 3 shows an exemplary circuit 300 useful in the implementation of logics 215 and 216. The measurement signals, labelled "STRRnnn", are received on line 141. In a first level 310, AND gate 311 produces a signal when measurement STRR109 is present, if measurement STRR141 is also present. If STRR109 is not present in the character, AND 312 is enabled by inverter 313 to produce a signal when STRR016 is present. AND 321 of second level 320 is enabled by the output of first-level AND 311 to produce a signal when measurement STRR142 is detected. AND 321 in turn enables AND 331 of a third level 330 upon detection of STRR031, and so forth. Inverter 322 enables AND 323 to pass measurement STRR008 when AND 311 is not satisfied. When AND 323 is satisfied, it enables another third-level AND (not shown) in the decision tree; when it is not satisfied, inverter 332 produces a REC04 signal indicating that the character has been successfully recognized as a numeral "4". Gates 324–326 operate in a similar manner from the output of AND 312 and the measurements STRR052, STRR001. Inverter 333 recognizes the character as a "2" upon the non-satisfaction of AND 324, while the direct output of AND 325 produces a REC07 signal identifying the character as a numeral "7". The output of AND 325 is also transmitted to third-level AND 334 through inverter 335; its output is recognized as a "5".

Conventional coding matrix 340 receives the RECO signals to generate therefrom a coded representation of the identity of the character recognized by the decision tree, or a "reject" code if no character is recognized. The coded representation, or recognition code, is then transmitted to line 211 (or to line 212, for logic 216).

Circuit 300 is but one example of an implementation for logics 215, 216. The levels 310–330 could be collapsed into a single rank of N-way AND gates, for instance. Similarly, sequential logics could be executed by implementing the logics in the form of a special-purpose processor such as that shown in U.S. Pat. No. 3,573,731, or in commonly assigned Application Ser. No. 272,698, filed July 7, 1972 by M. J. Kimmel. The logics need not be decision trees; either or both of them may be correlation networks, for example. That is, the invention is completely independent of the particular type of recognition means 215, 216 employed.

Figure 4:
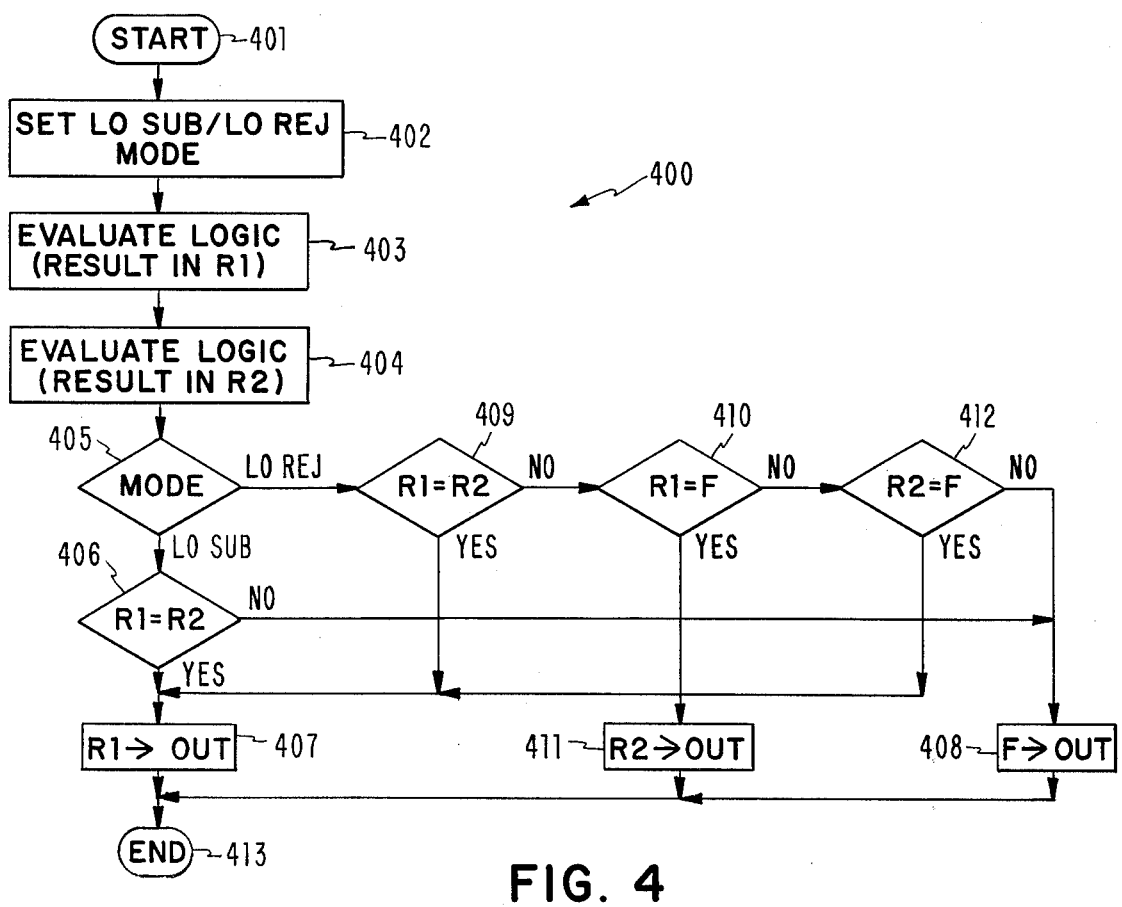
FIG. 4 shows a second embodiment of the invention.

FIG. 4 shows a method 400 of performing the invention when all or part of recognition unit 150, FIG. 1, is embodied in the form of a data processor, such as that described in the aforementioned application Ser. No. 272,698. After the start 401 of the recognition cycle, block 402 senses the state of a manually or automatically settable mode-control signal. Blocks 403 and 404 evaluate first and second recognition logics and store the resulting recognition codes in first and second registers R1 and R2, respectively. In this embodiment, it is preferred that the logics internally derive each character measurement during the execution of the logics themselves, and only when required by a particular character. Thus, the data inputs to logics 403, 404 are preferably the video bits directly from the stored character image, rather than pre-derived measurements or features.

Next, block 405 tests the state of the mode-control signal set in block 402. If the lowsubstitution mode has been selected, block 406 compares the recognition code in register R1 with that in R2. If they are the same, block 407 transfers the common code in R1 to an output register. If they differ, block 408 produces a "reject" or "fail" code F in the output register. Returning to block 405, the detection of the low-reject mode from block 402 again initiates a comparison of the recognition codes in R1 and R2, and an equality therebetween again causes block 407 to output the code from R1. But an inequality causes block 410 to ask whether the code in R1 is the "fail" code, indicating that logic 403 is unable to recognize the character. If so, block 411 outputs the contents of R2, i.e., the recognition code from the other logic 404. If logic 403 has not failed, block 410 initiates a comparison, in block 412, of the recognition code in R2 with the "fail" code. An equality from block 412 signifies that logic 404 has failed the character, but that logic 403 has made a successful recognition. Therefore, the code from R1 is output in this case. On the other hand, the "no" output from block 412 means that both logic 403 and logic 404 have produced successful but different recognitions of the same input character. In this situation, block 408 outputs the "fail" code. Here again, provision may be made for breaking this type of conflict if it is deemed to be worth the added cost and/or time penalty. Blocks 407, 408 and 411 all lead to end block 413, completing the procedure.

Table I hereinbelow shows a complete set of exemplary logics 403, 404 for recognizing machine-printed gothic numerals. These logics are executable in the recognition processor disclosed in the aforementioned application Ser. No. 272,698, and they may moreover be routinely converted to hard-wired digital-circuit implementations if desired. In the Table, the measurement designations "MEASnnn" correspond to the measurements "STRRnnn" having the same numerals "nnn". The variable "Annn" and "Bnnn" refer to pattern bits in a rectangular grid obtained from a vertical raster scan. The last two digits in each variable designate one of 40 vertical cells 0–39 in each scan, while the first letter and first digit represent one of 20 scans A0–A9, B0–B9; the origin is located at the bottom left corner of the character. The routine for each measurement also shows the logic equation which is evaluated for that measurement. These equations may be employed for the direct implementation of the corresponding measurements in hardwired logic circuits.

It has been mentioned that more than two logics may be in included in either of the embodiments of FIGS. 2 and 4. Such additional logics may operate to break conflicts as described and/or provide a larger number of selectable reject/substitution modes. It is also possible to provide another selectable mode in which only one of the logics is used for particular input characters. Such a balanced mode would allow the choice of a reject/substitution ratio intermediate between those of the low-substitution and low-reject modes, and might result in a hardware, storage or execution-time advantage in some instances. Other modifications within the scope and spirit of the invention will also be apparent to those skilled in the art.

TABLE I

```
9023   ***********************************************************************
9024   *             NHP  GOTHIC  TREE  CODE                                  *
9025   ***********************************************************************
9026   GTH10001  BAL    STRR109         GTH10001
9027             B      GTH10011
9028             BAL    STRR141         GTH10002
9029             B      GTH10008
9030             BAL    STRR142         GTH10003
9031             B      GTH10005
9032             BAL    STRR031         GTH10004
9033             B      RECO6
9034             BAL    STRR139         GTH10021
9035             B      GTH10028
9036             B      RECO9
9037   GTH10028  BAL    STRR048
9038             B      RECO8
9039             B      RECO6
9040   GTH10005  BAL    STRR011
9041             B      GTH10007
9042             BAL    STRR048         GTH10006
9043             B      RECO9
9044             B      RECO6
9045   GTH10007  BAL    STRR048
9046             B      RECO0
9047             B      RECO6
9048   GTH10008  BAL    STRR008
9049             B      RECO4
9050             BAL    STRR016         GTH10009
9051             B      GTH10022
9052             B      RECO2
9053   GTH10022  BAL    STRR098
9054             B      RECO9
9055             B      RECO3
9056   GTH10011  BAL    STRR016
9057             B      GTH10015
9058             BAL    STRR052         GTH10012
9059             B      RECO2
9060             BAL    STRR031         GTH10013
9061             B      GTH10024
```

```
9062              B      RECO3
9063  GTH10024  BAL      STRR027
9064              B      GTH10031
9065              B      RECO1
9066  GTH10031  BAL      STRR135
9067              B      GTH10041
9068              B      RECO2
9069  GTH10041  BAL      STRR017
9070              B      RECO7
9071              B      RECO5
9072  GTH10015  BAL      STRR001
9073              B      GTH10017
9074              B      RECO7
9075  GTH10017  BAL      STRR014
9076              B      GTH10019
9077              B      RECO5
9078  GTH10019  BAL      STRR012
9079              B      RECO7
9080              B      RECO3

9082  *************************************************************
9083  *           GOTHIC SECONDARY TREE                            *
9084  *************************************************************
9085  GTH20001  BAL      STRR061          GTH20001
9086              B      GTH20009
9087            BAL      STRR031          GTH20002
9088              B      GTH20006
9089            BAL      STRR051          GTH20003
9090              B      GTH20005
9091              B      REEC3
9092  GTH20005  BAL      STRR098
9093              B      REEC9
9094              B      REEC3
9095  GTH20006  BAL      STRR017
9096              B      REEC1
9097              B      REEC5
9098  GTH20009  BAL      STRR031
9099              B      GTH20015
9100            BAL      STRR079          GTH20010
9101              B      GTH20012
9102              B      REEC8
9103  GTH20012  BAL      STRR033
9104              B      GTH20014
9105            BAL      STRR152          GTH20013
9106              B      REEC0
9107            BAL      STRR096          GTH20020
9108              B      GTH20032
9109              B      REEC6
9110  GTH20032  BAL      STRR139
9111              B      REEC8
9112              B      CHRFAILL
9113  GTH20014  BAL      STRR141
9114              B      GTH20023
9115            BAL      STRR152          GTH20022
9116              B      REEC0
9117              B      REEC8
9118  GTH20023  BAL      STRR118
9119              B      CHRFAILL
9120              B      REEC4
9121  GTH20015  BAL      STRR001
9122              B      GTH20017
9123              B      REEC7
9124  GTH20017  BAL      STRR029
9125              B      GTH20019
9126            BAL      STRR097          GTH20018
9127              B      REEC6
9128              B      CHRFAILL
9129  GTH20019  BAL      STRR135
9130              B      GTH20025
9131              B      REEC2
9132  GTH20025  BAL      STRR107
9133              B      GTH20036
9134              B      REEC5
9135  GTH20036  BAL      STRR004
9136              B      CHRFAILL
9137              B      REEC7
9138  REEC0     ZR       X'F0'
9139              B      GOTHOUT
9140  REEC1     ZR       X'F1'
9141              B      GOTHOUT
9142  REEC2     ZR       X'F2'
9143              B      GOTHOUT
9144  REEC3     ZR       X'F3'
9145              B      GOTHOUT
9146  REEC4     ZR       X'F4'
9147              B      GOTHOUT
```

```
9148 REFC5     ZR    X'F5'
9149           B     GOTHOUT
9150 REFC6     ZR    X'F6'
9151           B     GOTHOUT
9152 REFC7     ZR    X'F7'
9153           B     GOTHOUT
9154 REFC8     ZR    X'F8'
9155           B     GOTHOUT
9156 REFC9     ZR    X'F9'
9157           B     GOTHOUT
9158 REFCX     ZR    X'E7'
9159 GOTHOUT   S     VIDBYT1
9160           B     DUOCHK
9161 CHRFAILL  ZR    X'3F'
9162           B     GOTHOUT
```

```
4773 ******************************************************************
4774 *          NHP MEASUREMENTS                                       *
4775 ******************************************************************
4776 *00003M001=(-A107.-A104.-A102.-A101.-A201.-A701.-A801.-A802.-A401
4777 *.-A110.-A804).A403.A405).(A407+A707).(-B006.-B306.-B606.-B906.
4778 *-C206).(-A807.-A907)
4779 MEAS001   SAS   1
4780           LCX   A107
4781           AMZ   X'0F'
4782           CB    FAILMEAS
4783           ACX   A104
4784           ACX   A102
4785           ACX   A101
4786           ACX   A201
4787           ACX   A701
4788           ACX   A801
4789           ACX   A802
4790           ACX   A401
4791           ACX   A110
4792           ACX   A804
4793           AX    A403
4794           AX    A405
4795           LX    A407
4796           OX    A707
4797           AS    0
4798           ACX   B006
4799           ACX   B306
4800           ACX   B606
4801           ACX   B906
4802           ACX   C206
4803           ACX   A807
4804           ACX   A907
4805           B     HIT
```

```
4872 *00012M004=(-A103.-A403.-A703.-B003.-B303.-B603.-B903.-C203).(-A115
4873 *.-A415.-A715.-B315.-B615.-B915.-C215).(-A104.-A107.-A110.-A113)
4874 *.(A708+B008+B308)
4875 MEAS004   SAS   1
4876           LCX   A103
4877           CB    FAILMEAS
4878           ACX   A403
4879           ACX   A703
4880           ACX   B003
4881           ACX   B303
4882           ACX   B603
4883           ACX   B903
4884           ACX   C203
4885           ACX   A115
4886           ACX   A415
4887           ACX   A715
4888           ACX   B315
4889           ACX   B615
4890           ACX   B915
4891           ACX   C215
4892           ACX   A104
4893           ACX   A107
4894           ACX   A110
4895           ACX   A113
4896           LX    A708
4897           OX    B008
4898           OX    B308
4899           AS    0
4900           B     HIT
```

```
4978  *00024M008=(A313+A316).(A513+A516).(A713+A716).(A913+A916).(B113
4979  *+B116).(B313+B316).(B413+B416)
4980  MEAS008   SAS    1
4981            ZR     X'FF'
4982            CB     FAILMEAS
4983            LX     A313
4984            OX     A316
4985            AS     0
4986            LX     A513
4987            OX     A516
4988            AS     0
4989            LX     A713
4990            OX     A716
4991            AS     0
4992            LX     A913
4993            OX     A916
4994            AS     0
4995            LX     B113
4996            OX     B116
4997            AS     0
4998            LX     B313
4999            OX     B316
5000            AS     0
5001            LX     B413
5002            OX     B416
5003            AS     0
5004            B      HIT
5032  *00030M011=(-A112.-A412.-A712).(A113+A116).(A313+A316).(A513+A516
5033  *).(A813+A816)
5034  MEAS011   SAS    1
5035            LCX    A112
5036            CB     FAILMEAS
5037            ACX    A412
5038            ACX    A712
5039            LX     A113
5040            OX     A116
5041            AS     0
5042            LX     A313
5043            OX     A316
5044            AS     0
5045            LX     A513
5046            OX     A516
5047            AS     0
5048            LX     A813
5049            OX     A816
5050            AS     0
5051            B      HIT
5052  *00033M012=(A313+A316).(A513+A516).(A713+A716).(A913+A916).(B113
5053  *+B116)
5054  MEAS012   SAS    1
5055            ZR     X'FF'
5056            CB     FAILMEAS
5057            LX     A313
5058            OX     A316
5059            AS     0
5060            LX     A513
5061            OX     A516
5062            AS     0
5063            LX     A713
5064            OX     A716
5065            AS     0
5066            LX     A913
5067            OX     A916
5068            AS     0
5069            LX     B113
5070            OX     B116
5071            AS     0
5072            B      HIT
5094  *00039M014=(-A918.-B011.-B211).(B413+B416).(B113+B116).(-B218.-B518
5095  *.-B617.-B615.-B612.-B618.-B611.-B511)
5096  MEAS014   SAS    1
5097            LCX    A918
5098            CB     FAILMEAS
5099            ACX    B011
5100            ACX    B211
5101            LX     B413
5102            OX     B416
5103            AS     0
5104            LX     B113
5105            OX     B116
5106            AS     0
5107            ACX    B218
5108            ACX    B518
5109            ACX    B617
5110            ACX    B615
5111            ACX    B612
```

```
5112           ACX    B618
5113           ACX    B611
5114           ACX    B511
5115           B      HIT
5116  *00042M016=(-B218,-B518,-B617,-B615,-B612,-B511,-B211).(B213+B216
5117  *).(B413+B416).(-B618,-B611)
5118  MEAS016  SAS    1
5119           LCX    B218
5120           CB     FAILMEAS
5121           ACX    B518
5122           ACX    B617
5123           ACX    B615
5124           ACX    B612
5125           ACX    B511
5126           ACX    B211
5127           LX     B213
5128           OX     B216
5129           AS     0
5130           LX     B413
5131           OX     B416
5132           AS     0
5133           ACX    B618
5134           ACX    B611
5135           B      HIT
5136  *00045M017=(-B218,-B518,-B617,-B615,-B612,-B511,-B211).(B213+B216
5137  *).(B413+B416).(-B618,-B611)
5138  MEAS017  SAS    1
5139           LCX    B218
5140           AMZ    X'1F'
5141           CB     FAILMEAS
5142           ACX    B518
5143           ACX    B617
5144           ACX    B615
5145           ACX    B612
5146           ACX    B511
5147           ACX    B211
5148           LX     B213
5149           OX     B216
5150           AS     0
5151           LX     B413
5152           OX     B416
5153           AS     0
5154           ACX    B618
5155           ACX    B611
5156           B      HIT
5308  *00154M027=(-A909,-A912).(-B115,-B118).(A610+A810).(A612+A812).(
5309  *A614+A814).(A616+A816).(A617+A817).(A618+A818).(A619+A819).(A620
5310  *+A820).(A622+A822).(A624+A824).(A626+A826).(-A921,-A924,-A927,-
5311  *A930)
5312  MEAS027  SAS    1
5313           LCX    A909
5314           CB     FAILMEAS
5315           ACX    A912
5316           ACX    B115
5317           ACX    B118
5318           LX     A610
5319           OX     A810
5320           AS     0
5321           LX     A612
5322           OX     A812
5323           AS     0
5324           LX     A614
5325           OX     A814
5326           AS     0
5327           LX     A616
5328           OX     A816
5329           AS     0
5330           LX     A617
5331           OX     A817
5332           AS     0
5333           LX     A618
5334           OX     A818
5335           AS     0
5336           LX     A619
5337           OX     A819
5338           AS     0
5339           LX     A620
5340           OX     A820
5341           AS     0
5342           LX     A622
5343           OX     A822
5344           AS     0
5345           LX     A624
5346           OX     A824
5347           AS     0
5348           LX     A626
5349           OX     A826
```

```
5350          AS     C
5351          ACX    A921
5352          ACX    A924
5353          ACX    A927
5354          ACX    A930
5355          B      HIT

5394  *00063M029=(A610+A810).(A612+A812).(A614+A814).(A616+A816).(A618
5395  *+A818).(A620+A820).(A622+A822).(A808+B008+B208)
5396  MEAS029  SAS    1
5397          ZR     X'1F'
5398          CB     FAILMEAS
5399          LX     A610
5400          OX     A810
5401          AS     C
5402          LX     A612
5403          OX     A812
5404          AS     0
5405          LX     A614
5406          OX     A814
5407          AS     C
5408          LX     A616
5409          OX     A816
5410          AS     C
5411          LX     A618
5412          OX     A818
5413          AS     0
5414          LX     A620
5415          OX     A820
5416          AS     0
5417          LX     A622
5418          OX     A822
5419          AS     0
5420          LX     A808
5421          OX     B008
5422          OX     B208
5423          AS     0
5424          B      HIT

5446  *00066M031=(A510+A810).(A612+A812).(A614+A814).(A616+A816).(A618
5447  *+A818).(A620+A820).(A622+A822).(A624+A824).(A626+A826)
5448  MEAS031  SAS    1
5449          ZR     X'FF'
5450          CB     FAILMEAS
5451          LX     A510
5452          OX     A810
5453          AS     C
5454          LX     A612
5455          OX     A812
5456          AS     C
5457          LX     A614
5458          OX     A814
5459          AS     0
5460          LX     A616
5461          OX     A816
5462          AS     0
5463          LX     A618
5464          OX     A818
5465          AS     0
5466          LX     A620
5467          OX     A820
5468          AS     0
5469          LX     A622
5470          OX     A822
5471          AS     0
5472          LX     A624
5473          OX     A824
5474          AS     0
5475          LX     A626
5476          OX     A826
5477          AS     C
5478          B      HIT
5479  *00069M033=(A226+A426).(A224+A424).(A222+A422).(A220+A420).(A229
5480  *+A529).(A218+A418).(A216+A416).(A214+A414).(A212+A412).(A329+A629
5481  *).(A310+A610)
5482  MEAS033  SAS    1
5483          ZR     X'FF'
5484          CB     FAILMEAS
5485          LX     A226
5486          OX     A426
5487          AS     0
5488          LX     A224
5489          OX     A424
5490          AS     0
5491          LX     A222
5492          OX     A422
5493          AS     0
5494          LX     A220
```

```
5495        OX      A420
5496        AS      0
5497        LX      A229
5498        OX      A529
5499        AS      0
5500        LX      A218
5501        OX      A418
5502        AS      C
5503        LX      A216
5504        OX      A416
5505        AS      0
5506        LX      A214
5507        OX      A414
5508        AS      C
5509        LX      A212
5510        OX      A412
5511        AS      0
5512        LX      A329
5513        OX      A629
5514        AS      0
5515        LX      A310
5516        OX      A610
5517        AS      0
5518        B       HIT
5723 *C0C99MC48=(-A720.-B020.-B320).(-A123.-A423.-A723.-B023).(-B011.
5724 *-B311.-B611.-B911.-C211).(-B012+B515).(B013+B016).(B313+B316).(
5725 *B513+B516).(-B913.-B916)
5726 MEAS048     SAS     1
5727            LCX     A720
5728            CB      FAILMEAS
5729            ACX     B020
5730            ACX     B320
5731            ACX     A123
5732            ACX     A423
5733            ACX     A723
5734            ACX     B023
5735            ACX     B011
5736            ACX     B311
5737            ACX     B611
5738            ACX     B911
5739            ACX     C211
5740            LCX     B012
5741            OX      B515
5742            AS      0
5743            LX      B013
5744            OX      B016
5745            AS      C
5746            LX      B313
5747            OX      B316
5748            AS      0
5749            LX      B513
5750            OX      B516
5751            AS      C
5752            ACX     B913
5753            ACX     B916
5754            B       HIT

5775 *0C105MC51=(-B219.-B019.-A919).(-B226.-B026.-A926).(B021+B024).(
5776 *B221+B224).(-A925.-A922.-A920)
5777 MEAS051     SAS     1
5778            LCX     B219
5779            CB      FAILMEAS
5780            ACX     B019
5781            ACX     A919
5782            ACX     B226
5783            ACX     B026
5784            ACX     A926
5785            LX      B021
5786            OX      BC24
5787            AS      C
5788            LX      B221
5789            OX      B224
5790            AS      0
5791            ACX     A925
5792            ACX     A922
5793            ACX     A920
5794            B       HIT
5795 *0C108MC52=(-B818.-B819.-B820.-B821.-B817).(B418+B718).(B420+B720
5796 *).(B422+B622+B822).(B424+B624+B824)
5797 MEAS052     SAS     1
5798            LCX     B818
5799            CB      FAILMEAS
5800            ACX     B819
5801            ACX     B820
5802            ACX     B821
```

```
5803            ACX     B817
5804            LX      B418
5805            OX      B718
5806            AS      0
5807            LX      B420
5808            OX      B72C

5809            AS      0
5810            LX      B422
5811            OX      B622
5812            OX      B822
5813            AS      0
5814            LX      B424
5815            OX      B624
5816            OX      B824
5817            AS      0
5818            B       HIT
6063  *00126M061=(-B024.-A824.-A723.-A720.-A718.-A817.-B017).(-A717.-A724
6064  *).(A919+A922).(B119+B122).(-B217.-B324)
6065  MEAS061   SAS     1
6066            LCX     B024
6067            AMZ     X'3F'
6068            CB      FAILMEAS
6069            ACX     A824
6070            ACX     A723
6071            ACX     A720
6072            ACX     A718
6073            ACX     A817
6074            ACX     B017
6075            ACX     A717
6076            ACX     A724
6077            LX      A919
6078            OX      A922
6079            AS      0
6080            LX      B119
6081            OX      B122
6082            AS      0
6083            ACX     B217
6084            ACX     B324
6085            B       HIT
6555  *00174M079=(A716.A614.A618).(-A616.-A516.-A316.-A116).(A514+A512
6556  *).(A518+A520)
6557  MEAS079   SAS     1
6558            LX      A716
6559            CB      FAILMEAS
6560            AX      A614
6561            AX      A618
6562            ACX     A616
6563            ACX     A516
6564            ACX     A316
6565            ACX     A116
6566            LX      A514
6567            OX      A512
6568            AS      0
6569            LX      A518
6570            OX      A520
6571            AS      0
6572            B       HIT
7105  MEAS096   SAS     1
7106  *00222M096=(-A132.-A432.-A732.-B032.-B332.-B632.-A724.-B024.-B324
7107  *.-B624).(-B625.-B628.-B631).(A925+A926).(B026+B226)
7108            LCX     A132
7109            AMZ     X'3F'
7110            CB      FAILMEAS
7111            ACX     A432
7112            ACX     A732
7113            ACX     B032
7114            ACX     B332
7115            ACX     B632
7116            ACX     A724
7117            ACX     B024
7118            ACX     B324
7119            ACX     B624
7120            ACX     B625
7121            ACX     B628
7122            ACX     B631
7123            LX      A925
7124            OX      A926
7125            AS      0
7126            LX      B026
7127            OX      B226
7128            AS      0
7129            B       HIT
```

```
7130 *00225M097=(-A524.-A525).(-A124.-A424).(-A137.-A134.-A131.-A128.
7131 *-A125.-A122).(A516+A519+A522).(A527+A530+A533).(A624+A824+B024+
7132 *B224).(A416+A419+A422)
7133 MEAS097    SAS    1
7134           LCX    A524
7135           CB     FAILMEAS
7136           ACX    A525
7137           ACX    A124
7138           ACX    A424
7139           ACX    A137
7140           ACX    A134
7141           ACX    A131
7142           ACX    A128
7143           ACX    A125
7144           ACX    A122
7145           LX     A516
7146           OX     A519
7147           OX     A522
7148           AS     0
7149           LX     A527
7150           OX     A530
7151           OX     A533
7152           AS     0
7153           LX     A624
7154           OX     A824
7155           OX     B024
7156           OX     B224
7157           AS     0
7158           LX     A416
7159           OX     A419
7160           OX     A422
7161           AS     0
7162           B      HIT
7163 *00228M098=(-A324.-A324).(A327+A330+A333).(-A424.-A724.-B024.A322
7164 *+A319+A316).(A124+A125).(A416+A419+A422+A425+A428+A431).(A229+A226
7165 *).(A225+A222)-
7166 MEAS098    SAS    1
7167           LCX    A324
7168           CB     FAILMEAS
7169           ACX    A324
7170           LX     A327
7171           OX     A330
7172           OX     A333
7173           AS     0
7174           ACX    A424
7175           ACX    A724
7176           ACX    B024
7177           LX     A322
7178           OX     A319
7179           OX     A316
7180           AS     0
7181           LX     A124
7182           OX     A125
7183           AS     0
7184           LX     A416
7185           OX     A419
7186           OX     A422
7187           OX     A425
7188           OX     A428
7189           OX     A431
7190           AS     0
7191           LX     A229
7192           OX     A226
7193           AS     0
7194           LX     A225
7195           OX     A222
7196           AS     0
7197           B      HIT
7338 *00243M107=(-A822.-A824.-A725.-A425.-A225.-A124.-A121.-A120).(A424
7339 *+A724).(A422+A722)
7340 MEAS107    SAS    1
7341           LCX    A822
7342           CB     FAILMEAS
7343           ACX    A824
7344           ACX    A725
7345           ACX    A425
7346           ACX    A225
7347           ACX    A124
7348           ACX    A121
7349           ACX    A120
7350           LX     A424
7351           OX     A724
7352           AS     0
7353           LX     A422
7354           OX     A722
7355           AS     0
7356           B      HIT
```

```
7427 *00249M109=(B023+B323+B623+B923+C223).(B020+B320+B620+B920+C220)
7428 *.(A125+A425+A725).(A120+A420+A720).(-A824+-A924+-A923).(-A822+-
7429 *A922).(A124+A424+A724).(A122+A422+A722).(B022+B322+B622+B922+C222
7430 *).(B024+B324+B624+B924+C224).(B025+B325+B625+B925+C225)
7431 MEAS109   SAS     1
7432          ZR      X'FF'
7433          CB      FAILMEAS
7434          LX      B023
7435          OX      B323
7436          OX      B623
7437          OX      B923
7438          OX      C223
7439          AS      0
7440          LX      B020
7441          OX      B320
7442          OX      B620
7443          OX      B920
7444          OX      C220
7445          AS      0
7446          LX      A125
7447          OX      A425
7448          OX      A725
7449          AS      0
7450          LX      A120
7451          OX      A420
7452          OX      A720
7453          AS      0
7454          LCX     A824
7455          OCX     A924
7456          OCX     A923
7457          AS      0
7458          LCX     A822
7459          OCX     A922
7460          AS      0
7461          LX      A124
7462          OX      A424
7463          OX      A724
7464          AS      0
7465          LX      A122
7466          OX      A422
7467          OX      A722
7468          AS      0
7469          LX      B022
7470          OX      B322
7471          OX      B622
7472          OX      B922
7473          OX      C222
7474          AS      0
7475          LX      B024
7476          OX      B324
7477          OX      B624
7478          OX      B924
7479          OX      C224
7480          AS      0
7481          LX      B025
7482          OX      B325
7483          OX      B625
7484          OX      B925
7485          OX      C225
7486          AS      0
7487          B       HIT
7537 *00265M118=(B026).(-A130.-A430.-A730.-B030).(-A226.-A223.-A220).
7538 *(A924+A824).(A519.A517+A518.A516).(A621+A722).(A316+A313).(-A431
7539 *.-A429.-A427.-A425.-A423).(-A222.-A323.-A424.-A525.-A626.-A727.
7540 *-A828.-A929.-B030.-B131)
7541 MEAS118   SAS     1
7542          LX      B026
7543          CB      FAILMEAS
7544          ACX     A130
7545          ACX     A430
7546          ACX     A730
7547          ACX     B030
7548          ACX     A226
7549          ACX     A223
7550          ACX     A220
7551          LX      A924
7552          OX      A824
7553          AS      0
7554          LX      A519
7555          AX      A517
7556          LX      A518
7557          AX      A516
7558          OS      0
7559          AS      0
7560          LX      A621
7561          OX      A722
7562          AS      0
```

```
7563            LX      A316
7564            OX      A313
7565            AS      0
7566            ACX     A431
7567            ACX     A429
7568            ACX     A427
7569            ACX     A425
7570            ACX     A423
7571            ACX     A222
7572            ACX     A323
7573            ACX     A424
7574            ACX     A525
7575            ACX     A626
7576            ACX     A727
7577            ACX     A828
7578            ACX     A929
7579            ACX     B030
7580            ACX     B131
7581            B       HIT
7906    *00282M130=(-A410.-A413.-A416.-A419.-A422.-A425.-A428.-A431.-A434
7907    *.-A437).(-A824.-A925.-B026.-B127).(-A823.-B227.-B430).(B326).(B224
7908    *+B124).(-A430.-A730.-B030.-B330).(A819.A817+A818.A816).(A816.A814
7909    *+A815.A813).(A921+B022)
7910    MEAS130 SAS     1
7911            LCX     A410
7912            CB      FAILMEAS
7913            ACX     A413
7914            ACX     A416
7915            ACX     A419
7916            ACX     A422
7917            ACX     A425
7918            ACX     A428
7919            ACX     A431
7920            ACX     A434
7921            ACX     A437
7922            ACX     A824
7923            ACX     A925
7924            ACX     B026
7925            ACX     B127
7926            ACX     A823
7927            ACX     B227
7928            ACX     B430
7929            AX      B326
7930            LX      B224
7931            OX      B124
7932            AS      0
7933            ACX     A430
7934            ACX     A730
7935            ACX     B030
7936            ACX     B330
7937            LX      A819
7938            AX      A817
7939            LX      A818
7940            AX      A816
7941            OS      0
7942            AS      0
7943            LX      A816
7944            AX      A814
7945            LX      A815
7946            AX      A813
7947            OS      0
7948            AS      0
7949            LX      A921
7950            OX      B022
7951            AS      0
7952            B       HIT
8030    *00291M135=(-A112.-A412.-A712.-B012.-B312.-B612.-B912.-C212).(B414
8031    *+B417+B420).(-C214.-C217.-C220).(A824+A827).(-B324.-B624.-B924.
8032    *-C224).(-B022.-B322.-B622.-B922.-C222).(B229+B529+B829).(-A425.
8033    *-A428)
8034    MEAS135 SAS     1
8035            LCX     A112
8036            CB      FAILMEAS
8037            ACX     A412
8038            ACX     A712
8039            ACX     B012
8040            ACX     B312
8041            ACX     B612
8042            ACX     B912
8043            ACX     C212
8044            LX      B414
8045            OX      B417
8046            OX      B420
8047            AS      0
8048            ACX     C214
8049            ACX     C217
8050            ACX     C220
8051            LX      A824
```

```
8052        OX      AB27
8053        AS      0
8054        ACX     B324
8055        ACX     B624
8056        ACX     B924
8057        ACX     C224
8058        ACX     BC22
8059        ACX     B322
8060        ACX     B622
8061        ACX     B922
8062        ACX     C222
8063        LX      B229
8064        OX      B529
8065        OX      B829
8066        AS      0
8067        ACX     A425
8068        ACX     A428
8069        B       HIT
8145 *0023 M139=(-A618.-A918.-B218.-B518.-B818).(BB15+C115).(B220+B222
8146 *).(A420+B421).(B620+B621).(B920+B821)
8147 MEAS139    SAS     1
8148        LCX     A618
8149        CB      FAILMEAS
8150        ACX     A918
8151        ACX     B218
8152        ACX     B518
8153        ACX     B818
8154        LX      BB15
8155        OX      C115
8156        OX      C115+120
8157        AS      0
8158        LX      B220
8159        OX      B222
8160        AS      0
8161        LX      B420
8162        OX      B421
8163        AS      0
8164        LX      B620
8165        OX      B621
8166        AS      0
8167        LX      B820
8168        OX      B821
8169        AS      0
8170        B       HIT
8171 *0023M141=(BC23+B323+B623+B923+C223).(B020+B320+B620+B920+C220)
8172 *.(A125+A425+A725).(A120+A420+A720).(-A824+-A924+-A923).(-A822+-
8173 *A922).(A124+A424+A724).(A122+A422+A722).(B022+B322+B622+B922+C222
8174 *).(B024+B324+B624+B924+C224).(B025+B325+B625+B925+C225).(A128+A428
8175 *+A824).(A118+A418+A822)
8176 MEAS141    SAS     1
8177        ZR      X'FF'
8178        CB      FAILMEAS
8179        LX      B023
8180        OX      B323
8181        CX      B623
8182        OX      B923
8183        OX      C223
8184        AS      0
8185        LX      B020
8186        OX      B320
8187        OX      B620
8188        OX      B920
8189        OX      C220
8190        AS      0
8191        LX      A125
8192        OX      A425
8193        OX      A725
8194        AS      0
8195        LX      A120
8196        OX      A420
8197        OX      A720
8198        AS      0
8199        LCX     A824
8200        OCX     A924
8201        OCX     A923
8202        AS      0
8203        LCX     A822
8204        OCX     A922
8205        AS      0
8206        LX      A124
8207        OX      A424
8208        OX      A724
8209        AS      0
8210        LX      A122
8211        OX      A422
8212        OX      A722
8213        AS      0
```

```
8214        LX      B022
8215        OX      B322
8216        OX      B622
8217        OX      B922
8218        OX      C222
8219        AS      0
8220        LX      B024
8221        OX      B324
8222        OX      B624
8223        OX      B924
8224        OX      C224
8225        AS      0
8226        LX      B025
8227        OX      B325
8228        OX      B625
8229        OX      B925
8230        OX      C225
8231        AS      0
8232        LX      A128
8233        OX      A428
8234        OX      A824
8235        AS      0
8236        LX      A118
8237        OX      A418
8238        OX      A822
8239        AS      0
8240        B       HIT
8241 *00306M142=(-A116.-A217.-A317.-A318.-A319.-A219.-A120).(A111+A411
8242 *+A711).(B011+B311+B611+B911+C211).(B014+B314+B614+B914+C214).(A415
8243 *+A615).(A718.A918+A918.B118.-A618.-A718).(B021+B321+B621+B921+C221
8244 *).(B023+B323+B623+B923+C223).(B025+B325+B625+B925+C225).(A124+A424
8245 *+A724).(A223+A423+A623).(-A418.-A518+-A417.-A517).(-A108.-A110.
8246 *-A112.-A114+-A122.-A124.-A126.-A128).(-B618.-B918.-C218+B218.B418
8247 *).(-A721.-A722+-A821.-A921+-B022.-B023+-A923.-B023+B118.B418).(
8248 *A421+A621)
8249 MEAS142    SAS     1
8250        LCX     A116
8251        CB      FAILMEAS
8252        ACX     A217
8253        ACX     A317
8254        ACX     A318
8255        ACX     A319
8256        ACX     A219
8257        ACX     A120
8258        LX      A111
8259        OX      A411
8260        OX      A711
8261        AS      0
8262        LX      B011
8263        OX      B311
8264        OX      B611
8265        OX      B911
8266        OX      C211
8267        AS      0
8268        LX      B014
8269        OX      B314
8270        OX      B614
8271        OX      B914
8272        OX      C214
8273        AS      0
8274        LX      A415
8275        OX      A615
8276        AS      0
8277        LX      A718
8278        AX      A918
8279        LX      A918
8280        AX      B118
8281        ACX     A618
8282        ACX     A718
8283        OS      0
8284        AS      0
8285        LX      B021
8286        OX      B321
8287        OX      B621
8288        OX      B921
8289        OX      C221
8290        AS      0
8291        LX      B023
8292        OX      B323
8293        OX      B623
8294        OX      B923
8295        OX      C223
8296        AS      0
8297        LX      B025
8298        OX      B325
8299        OX      B625
8300        OX      B925
8301        OX      C225
8302        AS      0
```

```
8303        LX     A124
8304        OX     A424
8305        OX     A724
8306        AS     C
8307        LX     A223
8308        OX     A423
8309        OX     A623
8310        AS     C
8311        LCX    A418
8312        ACX    A518
8313        LCX    A417
8314        ACX    A517
8315        OS     0
8316        AS     C
8317        LCX    A108
8318        ACX    A110
8319        ACX    A112
8320        ACX    A114
8321        LCX    A122
8322        ACX    A124
8323        ACX    A126
8324        ACX    A128
8325        OS     C
8326        AS     0
8327        LCX    B618
8328        ACX    B918
8329        ACX    C218
8330        LX     B218
8331        AX     B418
8332        OS     0
8333        AS     0
8334        LCX    A721
8335        ACX    A722
8336        LCX    A821
8337        ACX    A921
8338        OS     0
8339        LCX    B022
8340        ACX    B023
8341        OS     0
8342        LCX    A923
8343        ACX    B023
8344        OS     0
8345        LX     B118
8346        AX     B418
8347        OS     0
8348        AS     0
8349        LX     A421
8350        OX     A621
8351        AS     C
8352        B      HIT
8448   *)0318M152=(A720+A721).(A820+A821).(A920+A921).(B020+B021).(B120
8449   *+B121).(B220+B221).(B320+B321).(B420+B421).(-A924+-B024+-B124+-
8450   *B224).(-A915+-B015+-B115)
8451   MEAS152 SAS   1
8452        ZR     X'FF'
8453        CB     FAILMEAS
8454        LX     A720
8455        OX     A721
8456        AS     0
8457        LX     A820
8458        OX     A821
8459        AS     0
8460        LX     A920
8461        OX     A921
8462        AS     C
8463        LX     B020
8464        OX     B021
8465        AS     C
8466        LX     B120
8467        OX     B121
8468        AS     0
8469        LX     B220
8470        OX     B221
8471        AS     C
8472        LX     B320
8473        OX     B321
8474        AS     0
8475        LX     B420
8476        OX     B421
8477        AS     0
8478        LCX    A924
8479        OCX    B024
8480        OCX    B124
8481        OCX    B224
8482        AS     C
8483        LCX    A915
8484        OCX    B015
8485        OCX    B115
8486        AS     0
8487        B      HIT
```

Having described several preferred embodiments thereof, I claim as my invention:

1. In a pattern-recognition system having a detector for converting an input pattern into electrical signals, means for selectively altering the reject/substitution characteristics of said system, comprising:
   a plurality of recognition means having inputs coupled in parallel to said detector for producing a plurality of mutually independent recognition codes each representing an identity of said input pattern;
   comparison means coupled to said recognition means, for producing comparison signals indicative of the relationship of said recognition codes to each other and to a reject code;
   control means for receiving a plurality of reject/substitution mode signals; and
   output gating means coupled to both said comparison means and to said control means, for selecting among one of said recognition codes and said reject code in response both to said comparison signals and to said mode signals.

2. The apparatus of claim 1, wherein said control means is adapted to receive both a low-reject mode signal and a low-substitution mode signal.

3. The apparatus of claim 2, wherein said comparison means is adapted to produce a first comparison when one of said recognition codes corresponds to said reject code, and wherein said output gating means in responsive to said low-reject mode signal and to said first comparison signal to select another of said recognition codes.

4. The apparatus of claim 3, wherein said comparison means is further adapted to produce a second comparison signal when one of said recognition codes differs from another of said recognition codes, and wherein said output gating means is responsive to said low-substitution mode signal and to said second comparison to select said reject code.

5. The apparatus of claim 1, wherein said detector is a video detector for detecting light produced by an optical scanner.

6. In a machine recognition system having a video detector for receiving light from a document and converting said light into a single set of electrical signals and having recognition means for converting said set of signals into recognition codes representing said pattern, a method for selectively altering the reject/substitution characteristics of said system, comprising:
   producing from said single set of signals a plurality of mutually independent recognition codes for said input pattern;
   testing the state of a presettable mode-control signal adapted to indicate a plurality of reject/substitution characteristics;
   for a first state of said mode-control signal, comparing one of said recognition codes with another of said recognition codes, and gating out a reject code if said one recognition code differs from said other recognition code; and
   for a second state of said mode-control signal, comparing said one recognition code with said reject code, and gating out said other recognition code if said one recognition code is the same as said reject code.

7. The method of claim 6, comprising the further step of, for said second state of said mode-control signal, comparing said other recognition code with said reject code, and gating out said one recognition code if said other reject code is the same as said reject code and if said one reject code differs from said reject code.

8. The method of claim 7, comprising the further step of gating out said one recognition code for both said first and said second states of said mode-control signal if said one recognition code is the same as said other recognition code.

* * * * *